(12) United States Patent
Campanile et al.

(10) Patent No.: US 7,629,701 B2
(45) Date of Patent: Dec. 8, 2009

(54) MODULAR POWER GENERATING SYSTEM

(75) Inventors: Pasquale Campanile, Orbassano (IT); Franco Anzioso, Orbassano (IT)

(73) Assignee: C.R.F. Societa Consortile per Azioni, Turin (IT)

(*) Notice: Subject to any disclaimer, the term of this patent is extended or adjusted under 35 U.S.C. 154(b) by 313 days.

(21) Appl. No.: 11/826,706

(22) Filed: Jul. 18, 2007

(65) Prior Publication Data
US 2008/0018109 A1    Jan. 24, 2008

(30) Foreign Application Priority Data
Jul. 21, 2006 (EP) .................................. 06425511

(51) Int. Cl.
*H02P 9/04* (2006.01)
*F01K 13/00* (2006.01)
(52) U.S. Cl. .................. 290/2; 290/1 A; 60/646
(58) Field of Classification Search .................. 290/2, 290/1 A, 52; 60/646, 679, 641.1
See application file for complete search history.

(56) References Cited

U.S. PATENT DOCUMENTS

| | | | |
|---|---|---|---|
| 4,715,192 A * | 12/1987 | Katz | 62/323.1 |
| 5,845,496 A * | 12/1998 | Bachmann | 60/646 |
| 6,192,687 B1 * | 2/2001 | Pinkerton et al. | 60/646 |
| 6,854,273 B1 * | 2/2005 | Lasley et al. | 60/646 |
| 7,245,035 B2 * | 7/2007 | Anzioso et al. | 290/2 |
| 2005/0206167 A1 | 9/2005 | Gehret et al. | |

FOREIGN PATENT DOCUMENTS

WO    WO 2005/089257 A2    9/2005

* cited by examiner

*Primary Examiner*—Nicholas Ponomarenko
(74) *Attorney, Agent, or Firm*—Sughrue Mion, PLLC

(57) ABSTRACT

The system comprises a main cogeneration module which can be supplied with a flow of fuel for a combustion process and is able to generate electrical energy and thermal energy in the form of a flow of at least one first hot fluid, preferably water. The main module has an electrical output terminal or node which can be directly connected to electrical user appliances and can be connected in parallel to an external electric power generating and supply network via a controlled switching device. The system comprises moreover a bottoming cycle recovery cogeneration apparatus able to recover, and partially convert into useful work, thermal energy from the products of the combustion process;

an auxiliary generation module which can be supplied with thermal energy produced by the main module and is able to provide thermal energy at a lower temperature in the form of a flow of at least one second chilled fluid; and management and control devices preset to manage in a predetermined manner operation of the main module and the auxiliary module.

22 Claims, 4 Drawing Sheets

MODULAR POWER GENERATING SYSTEM

BACKGROUND OF THE INVENTION

The present invention relates to a modular system for generating power.

More specifically the invention relates to an innovative trigeneration system, i.e. a system able to produce electrical energy and thermal energy, the latter being in two utilisable forms, namely high-temperature energy which can be used for example for heating and/or for services, as well as low-temperature energy which can be used for example for air-conditioning rooms and/or services.

SUMMARY OF THE INVENTION

The modular power generating system according to the invention comprises essentially a main cogeneration module which can be supplied with a flow of fuel for a combustion process and is able to generate electrical energy and thermal energy in the form of a flow of at least one first hot fluid, preferably water; the main module having an electrical output terminal or node which can be directly connected to electrical user appliances and can also be connected in parallel to an external electric power generating and supply network via a controlled switching device;

a secondary recovery cogeneration apparatus (bottoming cycle configuration) associated with the main cogeneration module, for recovering, and partially converting into useful work, thermal energy from the products of said combustion process;

an auxiliary generation module which can be supplied with thermal energy produced by the main module or by the recovery apparatus and is able to provide thermal energy at a lower temperature in the form of a flow of at least one second chilled fluid; and management and control means preset to manage in a predetermined manner operation of the main module, the recovery apparatus and the auxiliary module;

the main cogeneration module comprising:

an electric power generating unit including an internal combustion engine supplied with said fuel and coupled to an alternating-current rotary electric generator, preferably of the three-phase type;

an electronic converter unit including an ac/dc converter connected to the output of said electric generator, a dc/ac converter, preferably having a three-phase output with neutral, connected to the output of the ac/dc converter via a dc link and to the electric output terminal or node of the main module, and an electric power storage module coupled to the abovementioned dc link, directly or via a bidirectional dc/dc converter, in such a way that said dc/dc converter is able to allow a flow of electrical energy from the storage module to the dc link and vice versa; and a heat exchange module coupled to the internal combustion engine and able to recover part of the heat generated by this engine, transferring it to said at least one first fluid, the heat exchange module having electrovalve control means able to allow variation in the degree of recovery of the heat generated by the internal combustion engine;

the auxiliary generation module comprising a heat pump intended to receive a flow of a hot fluid from said heat exchange module or from the internal combustion engine or from said recovery apparatus and able to provide at its output a flow of said at least one second fluid at a relatively lower temperature;

said management and control means being preset to:

regulate the electric power generated by the main module, controlling the speed of rotation and the fuel injection of the internal combustion engine in such a way that the latter operates with a predetermined efficiency;

regulate the ratio between the electric power and the thermal power generated by the main module, controlling the speed of rotation and the torque supplied by the internal combustion engine and driving in a predetermined manner the abovementioned electrovalve control means;

control in a predefined manner operation of the secondary recovery cogeneration apparatus;

manage in a predetermined manner operation of the main module disconnected or connected to said supply network and the automatic transition between said operating modes without interrupting the power supply to the electrical user appliances;

regulate, when the main module is connected to the network, the output voltage and the power factor of said main module and compensate for any deviations from the sinusoidal waveform of the current used by said electrical user appliances; and detect, while said power generating unit is deactivated, a condition where there is an interruption in the service of said electrical network and ensure the continuity of electrical power supply to at least some of said electrical user appliances, using electric power supplied by said storage module, for a minimum period of time sufficient to ensure operation of said electric generating unit.

BRIEF DESCRIPTION OF THE DRAWINGS

Further characteristic features and advantages of the invention will emerge from the detailed description below, provided purely by way of a non-limiting example, with reference to the accompanying drawings in which.

DETAILED DESCRIPTION OF THE INVENTION

Figure 1:
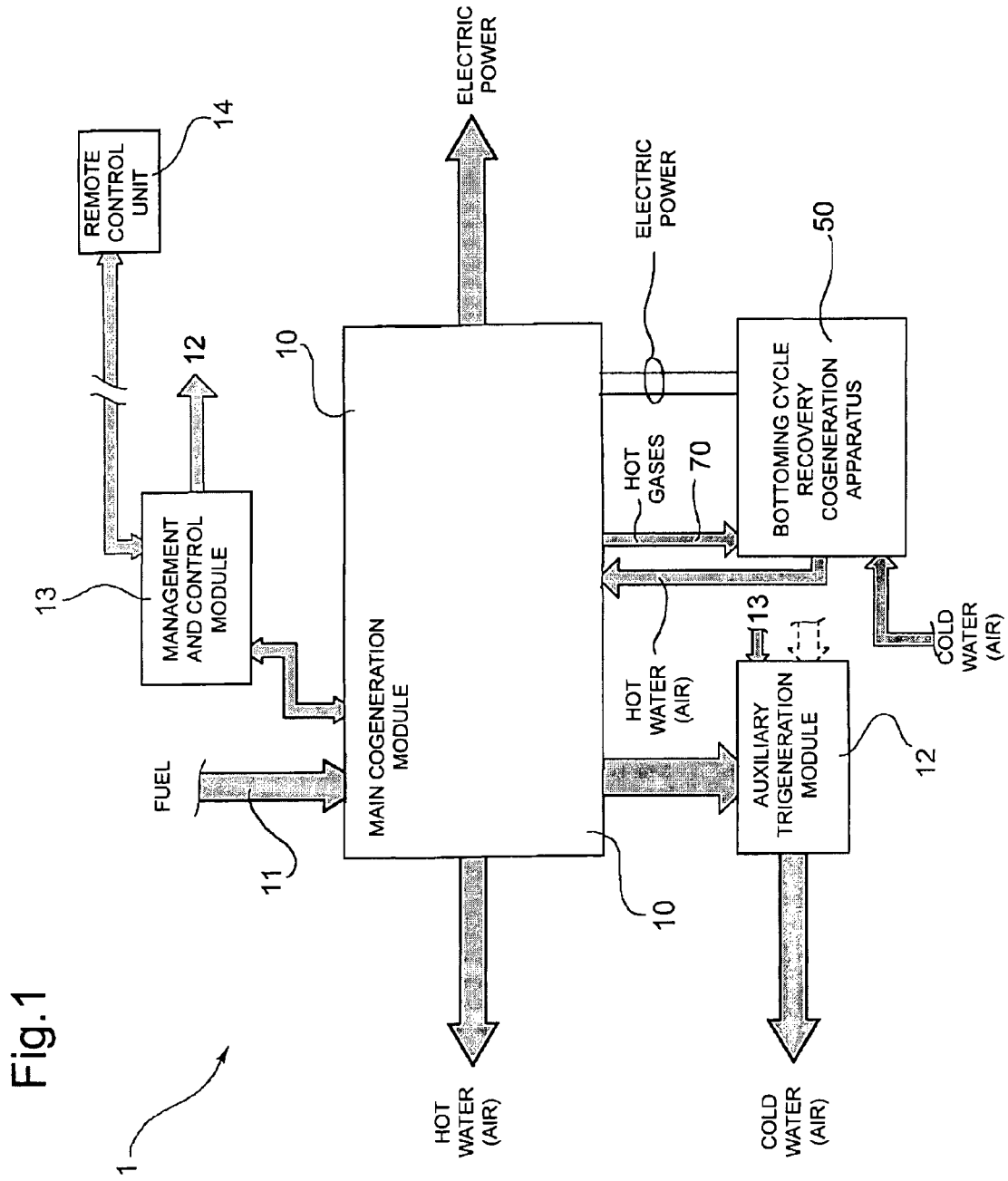
FIG. 1 is a block diagram which shows the general layout of a modular power generating system according to the present invention.
Figure 2:
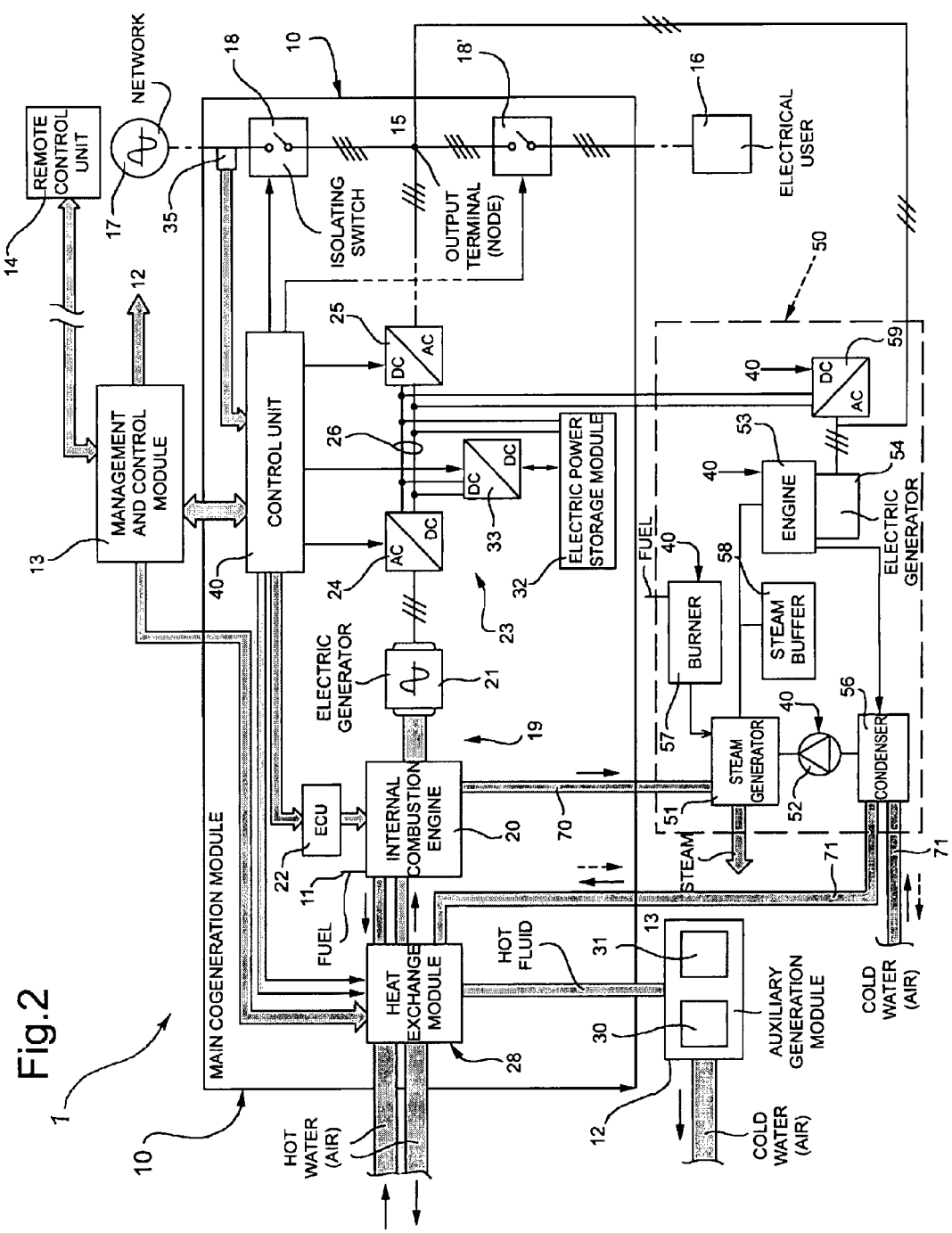
FIG. 2 is a block diagram which shows in greater detail the structure of a system according to the present invention.

In FIGS. 1 and 2 a modular power generating system, or polygenerator, according to the present invention is denoted overall by 1.

As will appear more clearly below, the system or polygenerator 1 allows the combined production of several energy vectors. In particular, the system or polygenerator allows the production of hot or cold electrical energy and thermal energy, with the possibility of:

regulating the power supplied within a very wide range, from 30% to more than 100% of the rated power (for transient periods), maintaining near-constant efficiency of conversion of the primary energy of the fuel used;

modulating the ratio between the electrical power and the thermal power produced;

monitoring or satisfying a variable power demand of the electrical and/or thermal type;

powering electrical user appliances connected or not connected to an electric power generating/supply network;

in the case of electrical user appliances connected to a network, with the polygenerator system it is possible to satisfy the energy requirement of these users continuously, also in the event of interruption in the supply of power by this network; and in the case of powering of electrical user appliances connected to a generation/supply network, attenuating the disturbances affecting the quality of the electrical service arising from the network and/or introduced into the network.

With reference to FIGS. 1 and 2, the modular system or polygenerator 1 comprises essentially a main cogeneration module 10 which can be supplied with a flow of fuel 11 and is able to produce electrical energy as well as thermal energy in the form of a flow of at least one first hot fluid, preferably water or optionally air.

The main cogeneration module 10 has, associated with it, an auxiliary trigeneration module 12 which can be supplied, during operation, with thermal energy produced by the main module 10 and is able to provide thermal energy at a lower temperature in the form of a flow of at least one second chilled fluid, for example water or optionally air.

In FIGS. 1 and 2 the numeral 13 denotes a management and control module preset to manage in a predetermined manner operation of the main module 10 and the associated auxiliary module 12 and a secondary recovery cogeneration module 50 which will be described below. The local management and control module 13 may in turn be connected to a remote control unit 14. In this case, the local management and control module 13 and the remote control unit 14 may be preset to implement remote management methods, carrying out for example the functions of monitoring the operational parameters, production scheduling, real-time control of production with adaptation to variations in the local power demand and if necessary depending on the trend in energy prices, multiple-hour tariffing, diagnostics and, if necessary, prognostics, with automatic activation of repair and maintenance procedures, etc.

A remote control unit 14 may be optionally connected to a plurality of modular generating systems or polygenerators according to the present invention and may therefore be conveniently preset for co-ordinated management of the operation of such a plurality of systems or polygenerators, also when installed in different locations.

With reference to FIG. 2, the main cogeneration module 10 has an electrical output terminal or node 15 which can be connected directly to electrical user appliances denoted overall by 16 and can also be connected in parallel to an external electric power generating/supply network 17 by means of a controlled switching device 18 of the type known per se. This switching device may be of the electromechanical or solid-state type. An additional similar switching device 18' may be arranged between the output node 15 and the electrical user appliances 16.

As shown in particular in FIG. 2, the main cogeneration module 10 comprises an electric power generating unit 19 including an internal combustion engine 20 supplied with the fuel 11 and coupled to an alternating-current rotary electric generator denoted by 21, preferably of the three-phase type.

An electronic control unit (ECU) 22 is associated with the internal combustion engine 20.

The rotary electric generator 21 is, for example, an asynchronous three-phase generator.

An electric starter motor of the conventional type (not shown) may be associated with the internal combustion engine 20. Alternatively, the electric generator 21 may be a reversible electric machine able to operate both as a generator and as a motor and, when operating as a motor, may be used for starting the associated internal combustion engine 20.

An electronic converter unit denoted overall by 23 is connected to the output of the rotary electric generator 21. This unit comprises an ac/dc converter 24 connected to the output of the generator 21 and a dc/ac converter or inverter 25 connected to the output of the converter 24 via a dc link 26.

The dc/ac converter 25 preferably has a three-phase with neutral, or single-phase output, and is coupled to the output terminal or node 15.

The main cogeneration module 10 also comprises a heat exchange module 28 (FIGS. 2 and 4) coupled to the internal combustion engine 20 and able to recover part of the heat generated by this engine during operation, transferring it to a fluid which, as already mentioned, is conveniently water or optionally air.

Figure 4:
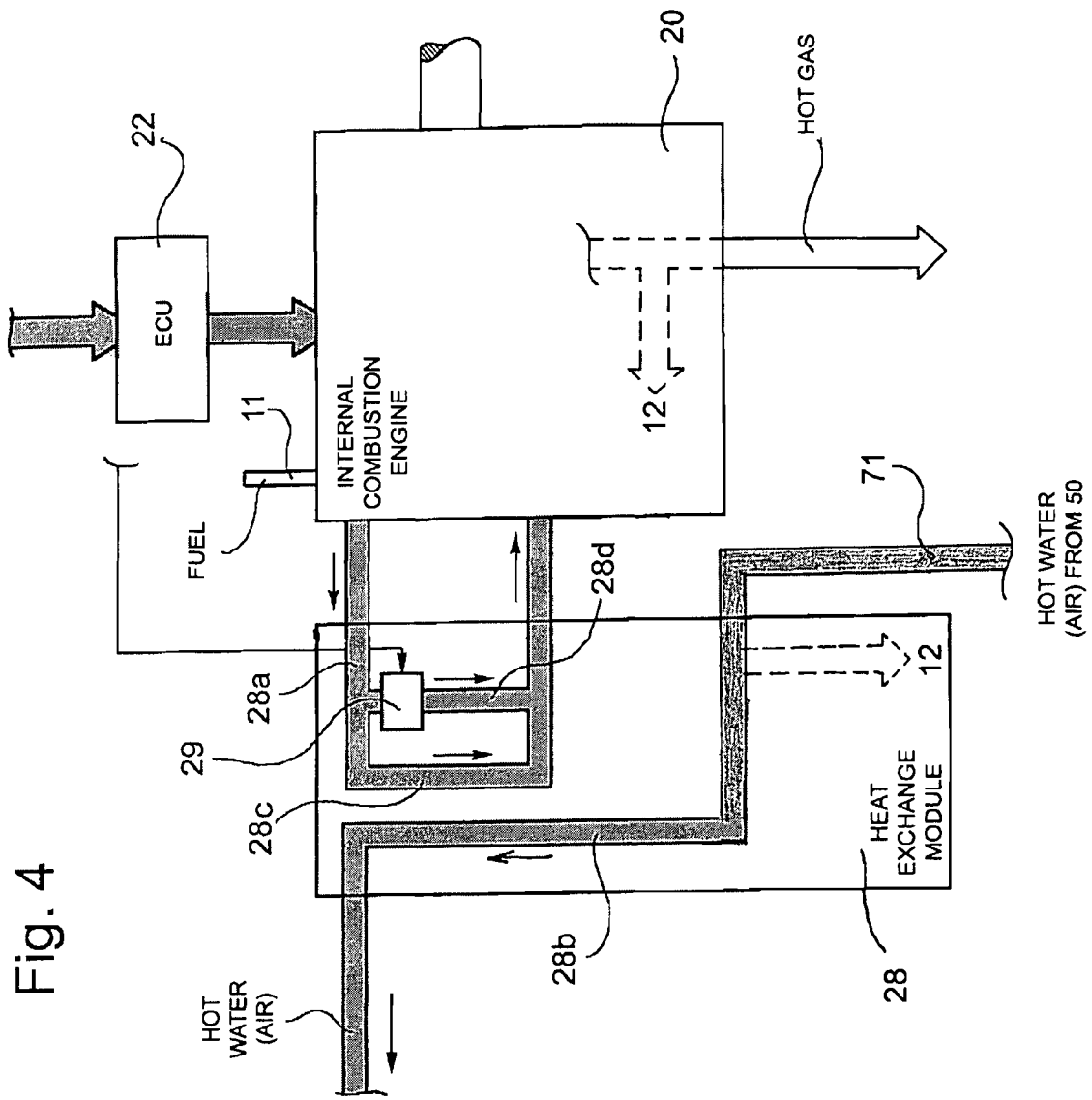
FIG. 4 is a partial block diagram which shows an embodiment of a heat exchange module included in a modular power generating system according to the present invention.

With reference to the schematic illustration of FIG. 4, the module 28 may comprise a heat exchanger of the liquid/liquid or liquid/air type intended to transfer to the fluid flowing in the output circuit 28b the heat recovered from the fluid (for example the cooling water of the engine 20) which flows in the input circuit 28a.

Conveniently, the input circuit 28a comprises a line 28c in a heat exchange relationship with the output circuit 28b and a bypass line 28d which is not in a heat exchange relationship with the output line but which allows, when appropriate or necessary, dissipation of at least part of the heat conveyed by the liquid flowing in the input circuit 28a. The bypass line 28d, which is hydraulically in parallel with the line 28c, has, arranged along it, at least one regulating electrovalve 29 which allows variation in the throughput of the cooling liquid of the engine 20 via this bypass line, from zero to a predefined maximum value.

As will become clearer from below, the output circuit 28b of the module 28 conveniently is connected to a secondary bottoming cycle recovery cogeneration apparatus 50, as will be described below.

With reference to FIG. 2, the auxiliary generation module 12 comprises a heat pump 30 intended to receive from the heat exchange module 28 or from the secondary recovery apparatus 50 or even directly from the internal combustion engine 20 a flow of hot fluid and is able to output a flow of fluid, such as water or optionally air, at a relatively lower temperature which can be used for air-conditioning a room and/or for other services or purposes. The heat pump 30 is for example of the chemical type, in particular of the type comprising a drying liquid.

The auxiliary generation module 12 may also comprise a thermal power storage device 31 of the type known per se.

In FIG. 2 the numeral 50 denotes overall a bottoming cycle recovery cogeneration apparatus coupled to the main cogeneration module 10 in order to perform recovery of the thermal energy from the (exhaust gas) products of the combustion process which takes place in the internal combustion engine 20.

For this purpose, the recovery cogeneration apparatus 50 comprises an annular fluid circuit including a steam generator 51 able to receive a flow of liquid, for example water, from a circulating pump 52 and convert this flow into a flow of steam using the heat of the exhaust gases produced by the engine 20 of the main module 10. These gases reach the steam generator 51 via a pipe 70.

A steam engine 53, which may be of the reciprocating or rotary type, is connected to the output of the steam generator 51.

In the embodiment shown in FIG. 2, an alternating-current rotary electric generator 54, preferably a three-phase alternator, is coupled to the engine 53 and has operationally available at its output a three-phase voltage system.

The output of the electric generator 54 may be used directly for connection to the supply network 17 or for directly powering local electrical users 16.

Alternatively, or in addition, as shown in FIG. 2, the output of the electric generator 54 may be connected to the input of an ac/dc converter 59, the output of which may be conveniently connected to the dc link 26.

Downstream of the engine 40 the steam which flows in the abovementioned annular fluid circuit reaches the input of a first condensation stage 55 and then a second condensation stage 56.

In the condensation stage 56 the fluid is further condensed as a result of the heat exchange with a current of cold fluid (preferably water, or air) supplied from outside via a pipe 71 which downstream of the condenser 56 continues towards the heat exchange module 28 and in particular towards the output circuit 28b thereof (FIGS. 2 and 4).

In a configurational variant not shown in the drawings the flow of fluid from outside (water or air) through the pipe 71 could be inventive depending on the condensation temperature and therefore the pressure level in the condenser 56. In this variant the external fluid would enter cold into the exchanger 28 and would exit hot from the condenser 56.

The outlet of the condenser 56 is connected to the inlet or delivery of the circulating pump 52.

With reference to FIG. 2, conveniently a steam buffer 58 is connected between the steam generator 51 and the steam engine 53.

The recovery cogeneration apparatus 50 operates essentially using a Rankine thermodynamic cycle.

As shown in FIG. 2, a burner 57 coupled to the steam generator 51 may be associated with the bottoming cycle recovery apparatus 50. Preferably, although not necessarily, this burner is supplied with the same fuel as the internal combustion engine 20.

Owing to the presence of the burner 17, the recovery apparatus 50 not only may operate in slave mode, recovering the residual heat from the combustion products of the internal combustion engine 20, but is also able, if necessary, to operate autonomously for the generation of electrical and/or thermal energy. The entire modular generating system as a whole thus has a greater operational flexibility.

Again with reference to FIG. 2, an electric power storage module 32 is coupled to the dc link 26 of the electronic converter unit 23, directly or via a dc/dc converter 33 of the bidirectional type. This converter 33 is able to allow a flow of electrical energy from the storage module 32 to the dc link 26 and vice versa.

The main cogeneration module 10 comprises an electronic control unit 40 including, for example, a microprocessor. This unit 40 is connected to the control inputs of the switching device 18 and 18', to devices 35 for detecting the network voltage and current upstream of the switching devices 18 and 18', to the converters 24, 25 and 33, to the control unit 22 of the internal combustion engine 20 and to the electrovalves 29 and 29' of the heat exchange module 28.

The control unit 40 of the main cogeneration module is also preset to control in a predefined manner operation of the recovery cogeneration apparatus 50. For this purpose the control unit 40 is connected for example to the circulating pump 52, to the burner 40, where present, and also, where present, to the ac/dc converter 59 and the electrovalve devices (not shown) used to control and/or regulate operation of the recovery cogeneration apparatus 50.

The control unit 40 of the main cogeneration module 10 is also connected and preset to dialogue with the management and control module 13 which in turn is connected and preset to control the auxiliary generation module 12.

Figure 3:
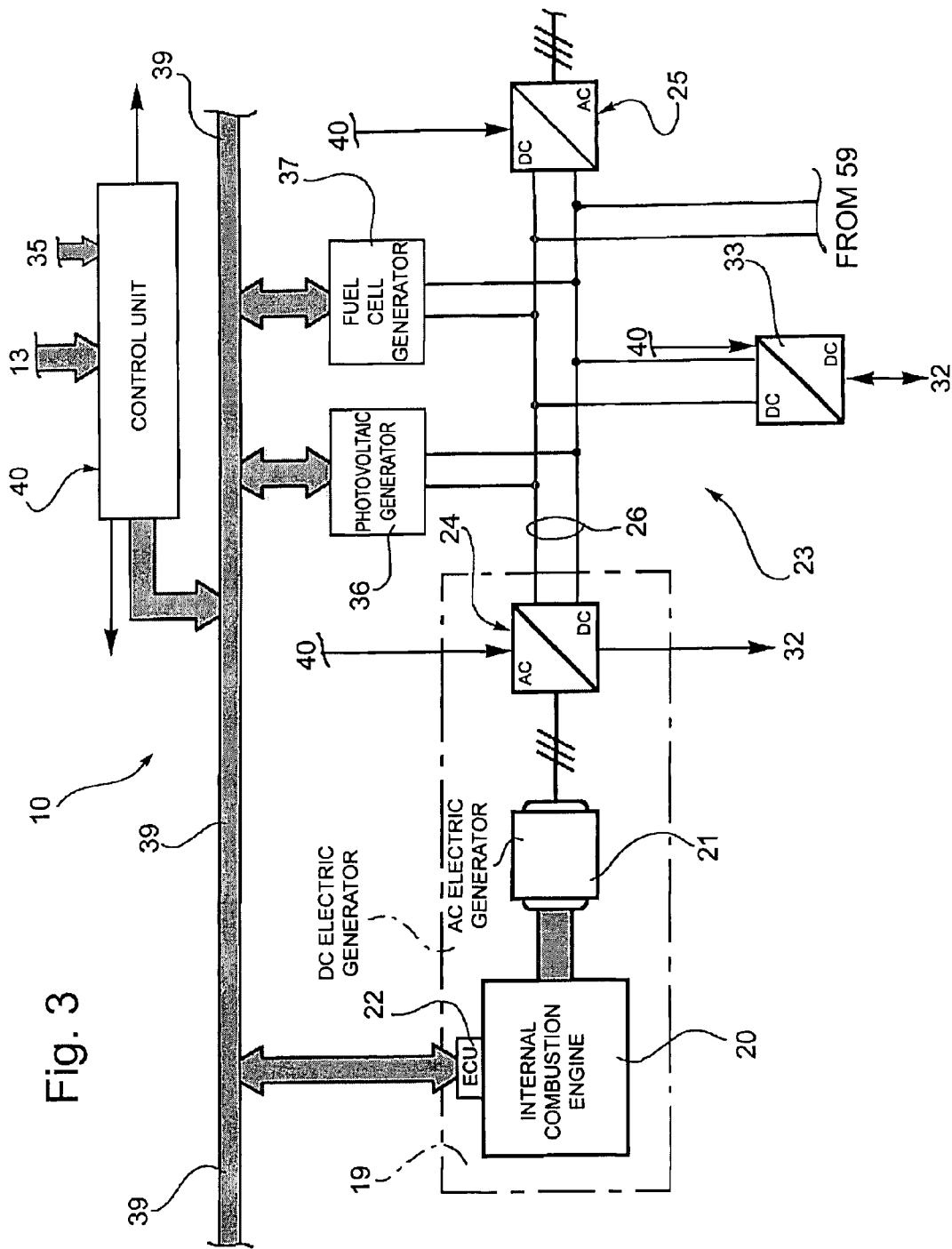
FIG. 3 is a block diagram which shows part of the structure of a variation of embodiment of a generating system according to the invention.

By way of variations of embodiment of the main cogeneration module 10, the output of at least one additional direct-current voltage generator, such as a photovoltaic generator, is connected to the dc link 26. FIG. 3 of the accompanying drawings shows such a variation of embodiment, in which a photovoltaic voltage generator 36 and a fuel cell generator 37 are connected to the dc link 26. In such an embodiment the control unit 40 is able to dialogue with the control unit 22 associated with the internal combustion engine 20 as well as the additional generators 36 and 37 by means of a communication bus 39 operating for example using a well known protocol CAN.

Having described the layout of modular power generating systems according to the invention, the operating modes and strategies thereof will now be described with particular reference to the main cogeneration module 10.

Operation of the main cogeneration module 10 is conveniently structured in three hierarchical control levels:

level 1 or system control: this level concerns control of the main module 10 as a whole and operates as an interface with the exterior, manages the service of power generation for the users depending on the demand, communicates with the central remote control system of the utility which manages the network 17, where necessary manages a plurality of cogeneration modules of different modular systems or polygenerators and the associated devices for interfacing with the electrical network;

level 2 or local generation control: this level concerns control of the electronic converter unit 23 as regards the electrical part, the heat exchange module 28 and/or the recovery cogeneration apparatus 50 as regards the thermal part; and level 3 or specific control of the generation devices: this level concerns direct control of the engine/generator unit 20-21, management of the batteries of the electric power storage module 32 and control of the burner 57 (where present) of the recovery cogeneration apparatus 50.

Level 1 of control, or system control, may be implemented by means of a functions software or a finished-state machine. The strategies used by this control module envisage production of thermal and/or electrical energy depending on the economic and electrical load conditions of the network 17 and the local requirements of the users.

A time plan for power production may be calculated on the basis of a statistical prediction of the user demand and the trend in market prices.

Depending on the existing prices and the user demand for electric power, it is possible to envisage a strategy aimed at minimizing a cost function which depends not only on the prices of electric power but also on the efficiency of the production chain of the modular cogeneration system.

The level 2 control strategies concern control of generation. The logic routines for controlling electric power generation are managed by the control unit 40.

This unit may be in particular preset to regulate the electric power produced by the main module 10, controlling the speed of rotation and (electronic) injection of the fuel of the internal combustion engine 20 so that the latter operates with a predetermined efficiency which may be a constant efficiency or controlled and variable efficiency depending on minimization of the emissions or depending on the thermal power demand.

The control unit 40 may also be preset to regulate the ratio between the electric power and the thermal power produced by the main module 10, controlling the speed of rotation and the torque supplied by the internal combustion engine 20 and driving in a predefined manner the electrovalve associated with the bypass line of the heat exchange module 28. The ratio between the electric power and the thermal power produced may thus be varied more or less freely, something which is impossible with the conventional generation systems.

The control unit 40 may also be preset so that, in response to a given request for electric power, by regulating the torque supplied and the speed of rotation of the engine 20, the latter operates in operating conditions which on the one hand satisfy the electric power requirement and on the other hand ensure an optimum compromise between the electrical efficiency and minimization of the emissions.

The control unit 40 is also preset to manage in a predetermined manner operation of the main cogeneration module 10 either disconnected or connected to the network 17 and the automatic transition between the said two operating modes.

A further function of the control unit 40 consists in regulating, when the main cogeneration module 10 is connected to the network 17, the electrical parameters at the output of said module 10 and compensating for any deviations from the sinusoidal waveform of the current used by the electrical user appliances 16 or introduced into the electrical supply network.

The control unit 40 is also preset to detect, while the power generator unit 1 is deactivated, a condition where there is an interruption in the service of the electrical network 17 and thus ensure the continuity of electric power supply to the user appliances 16 or to at least some of them with electric power supplied by the storage module 32, i.e. for a minimum period of time, sufficient to ensure operation of the electric generating unit comprising the engine 20 and the rotary generator 21. Compared to the conventional solutions (which envisage the combination of a UPS—Uninterrupted Power Supply—and an electricity generating unit), the system according to the invention offers the advantage that it has a virtually infinite autonomy and a storage system up to ten times smaller in size and weight.

The system according to the invention is able to pass from operation in parallel with the network 17 to operation in "isolation", i.e. separate from the network and connected to only privileged loads 16, and vice versa, without this resulting in any type of interruption in service, being suitably synchronised with the network 17. These functions are performed by connecting the system according to the invention in parallel with the loads, while in the ordinary systems the back-up apparatus is in series with the loads. With the solution according to the invention it is possible to eliminate the losses in the integrative power from the network and the need for devices for bypassing the system in the event of a malfunction.

The control unit 40 may also be preset to perform an active filtering function: with the switching device 18 closed, the inverter 25 is stably connected in parallel with the network 17 and with the user appliances 16. In this operating mode the control unit 40 automatically compensates for the deformations in the current produced by non-linear loads within the current limits of the machine, so that the current at the node 15, viewed from the side of the network 17, has a waveform which is as close as possible to the sinusoidal waveform. Filtering is performed by electronically controlling the output voltage and current and is therefore able to correct any harmonic, not needing to be tuned, as in the case of ordinary filters.

The control unit 40 may also be preset to perform a function involving elimination or "smoothing" of the voltage "drops" by means of continual analysis of the value of the output voltage and drawing, as required, power from the electric power storage module 32, used as a buffer.

The main cogeneration module 10 may also be used as a reactive power generator of both the inductive and capacitive type, in accordance with the load conditions of the network 17 in real time, and with continuous adjustment, suitably phase-shifting the voltage and the current supplied. This allows more efficient use of the network transformers and lines (or a reduction in losses, for the same load) and rephasing of highly variable loads.

Control level 3 envisages carrying out strategies implemented in this case also by the control unit 40 of the main cogeneration module 10. These strategies concern essentially start-up of the engine/generator unit 20-21, control of the active power generating unit in parallel with the three-phase network 17 and control of the autonomous power generation.

Start-up of the main cogeneration module is performed upon the request of the user. The start-up operation may be performed by means of an electric starter motor associated with the internal combustion engine 20 or by means of the electric generator 21 when the latter is in the form of a reversible electric machine and provided that a sufficiently high level of power is available at the terminals of the conversion unit 23.

Control of the main cogeneration module 10 as a generator with active power operation in parallel with the network 17 is performed by converting the direct-current power from the dc link 26 depending on the load demand. Compared to a conventional generating system, electrical supplying of the loads is performed by dividing up the power supply requirement using a strategy optimized on the basis of the load conditions (for example rapid variations or power requirements in excess of the capacity of the main generator) or on the basis of criteria or strategies of an economic nature (as per indications provided by control level 1).

The electric power storage module 32 ensures the continuity of the power supply during start-up of the engine/generator 20-21 and during the inevitable load transients.

The system may also operate on unbalanced loads.

During operation of the module 10 as an autonomous power generator, the switching device 18 is open and the output of the converter unit 23 represents the voltage source for the electrical users 16. The control unit 40, upon variation in the load, drives the conversion unit 23 so as to maintain at the output node 15 a set of three symmetrical sinusoidal voltages having an effective value and frequency within the limits of the prescribed tolerances, i.e. admissible for the user appliances 16.

The storage module 32 ensures the continuity of the power supply during start-up of the engine/generator 20-21 and during the inevitable load transients.

Obviously, without modifying the principle of the invention, the embodiments and the constructional details may be widely varied with respect to that described and illustrated purely by way of a non-limiting example, without thereby departing from the scope of the invention as defined in the accompanying claims.

What is claimed is:

1. Modular power generating system, comprising
a main cogeneration module which can be supplied with a flow of fuel for a combustion process and is able to generate electrical energy and thermal energy in the form of a flow of at least one first hot fluid, preferably water; the main module having an electrical output terminal or node which can be directly connected to electrical user appliances and can be connected in parallel to an external electric power generating and supply network via a controlled switching device;
a bottoming cycle recovery cogeneration cycle apparatus associated with the main cogeneration module, for recovering, and partially converting into useful work, thermal energy from the products of said combustion process;
an auxiliary generation module which can be supplied with thermal energy produced by the main module or by the recovery cogeneration apparatus and is able to provide thermal energy at a lower temperature in the form of a flow of at least one second chilled fluid; and
management and control means preset to manage in a predetermined manner operation of the main module, the recovery cogeneration apparatus and the auxiliary module;
the main cogeneration module comprising:
an electric power generating unit including an internal combustion engine supplied with said fuel and coupled to an alternating-current rotary electric generator, preferably of the three-phase type;
an electronic converter unit including an ac/dc converter connected to the output of said electric generator, a dc/ac converter, preferably with a three-phase output, connected to the output of the ac/dc converter via a dc link and to the electric output terminal or node of the main module, and an electric power storage module coupled to the abovementioned dc link, directly or via a bidirectional dc/dc converter, in such a way that said dc/dc converter is able to allow a flow of electric power from the storage module to the dc link and vice versa; and
a heat exchange module coupled to the internal combustion engine and able to recover part of the heat generated, during operation, by this engine, transferring it to said at least one first fluid, said heat exchange module having electrovalve control means able to allow variation in the degree of recovery of the heat generated by the engine;
the auxiliary generation module comprising a heat pump intended to receive a flow of a hot fluid from said heat exchange module or from the engine or from said recovery cogeneration apparatus and able to provide at its output a flow of said at least one second fluid at a relatively lower temperature;
said management and control means being preset to:
regulate the electric power generated by the main module, controlling the speed of rotation and the fuel injection of the internal combustion engine in such a way that the latter operates with a predetermined efficiency;
regulate the ratio between the electric power and the thermal power generated by the main module, controlling the speed of rotation and the torque supplied by the internal combustion engine and driving in a predetermined manner the abovementioned electrovalve control means;
control in a predefined manner operation of the recovery cogeneration apparatus;
manage in a predetermined manner operation of the main module disconnected or connected to said network and the automatic transition between said operating modes;
regulate, when the main module is connected to the network, the output voltage and the power factor of said main module and compensate for any deviations from the sinusoidal waveform of the current supplied to said electrical user appliances; and
detect a condition where there is an interruption in the service of said electrical network and ensure the continuity of electrical power supply to at least some of said user appliances, using electric power supplied by said storage module, for a minimum period of time sufficient to ensure operation of said electric generator unit.

2. Modular power generating system according to claim 1, in which the electrical output terminal or node can be connected to the external network by means of switching means including an interruption system of the solid-state and/or electromechanical type.

3. Modular power generating system according to claim 1, in which the recovery apparatus comprises a fluid circuit including
a steam generator able to receive a flow of liquid, in particular water, from a circulating pump and convert this flow into a flow of steam using the heat of the exhaust gases produced by the engine of the main module;
a steam engine connected to the output of the steam generator, and
a condensation means connected between the steam engine and the input of the circulating pump.

4. Modular power generating system according to claim 3, in which the steam engine is coupled to an additional alternating-current rotary electric generator, preferably of the three-phase type.

5. Modular power generating system according to claim 2, in which said additional electric generator is connected to said electrical output terminal or node.

6. Modular power generating system according to claim 3, in which the recovery cogeneration apparatus also comprises a burner which can be coupled to the steam generator.

7. Modular power generating system according to claim 3, in which the recovery cogeneration apparatus also comprises a steam buffer connected between the steam generator and the steam engine.

8. Modular power generating system according to claim 4, in which an additional ac/dc converter is coupled to the output of said additional electric generator.

9. Modular power generating system according to claim 7, in which the output of said additional ac/dc converter associated with said additional electric generator is coupled to the abovementioned dc link.

10. Modular power generating system according to claim 3, in which said condenser means is able to perform condensation of the fluid from the steam engine by means of heat exchange with a flow of liquid or gas from outside directed to the abovementioned heat exchange module.

11. Modular power generating system according to claim 3, in which the steam engine includes a turbine.

12. Modular power generating system according to claim 3, in which the recovery cogeneration apparatus operates essentially using a Rankine thermodynamic cycle.

13. Modular power generating system according to claim 1, in which a control unit including a digital signal processor is associated with the electric generator unit, said control unit being connected to a control input of the abovementioned switching device, to the ac/dc converter and dc/ac converter of the converter unit, to the abovementioned dc/dc converter and an electronic control unit of the internal combustion engine and also to means for detecting the voltage and the current in the network upstream of said switching device.

14. Modular power generating system according to claim 3, in which said control unit is also preset to control in a predefined manner the pump and the steam engine of the recovery cogeneration apparatus.

15. Modular power generating system according to claim 6, in which the control unit is also preset to control in a predetermined manner the abovementioned burner of the recovery cogeneration apparatus.

16. Modular power generating system according to claim 8, in which the control unit is also preset to drive in a predetermined manner the abovementioned additional ac/dc converter.

17. Modular power generating system according to claim 1, in which said dc/dc converter is able to perform recharging of the electric power storage module and is arranged so that its side connected to the dc link has a higher voltage than its side connected to the electric power storage module.

18. Modular power generating system according to claim 1, in which the electric power storage module is connected to the dc link in such a way that it may be charged by the ac/dc converter and/or by the dc/ac converter.

19. Modular power generating system according to claim 1, in which the output of at least one additional direct-current voltage generator, such as a photovoltaic generator or a fuel cell generator, is connected to said dc link.

20. Modular power generating system according to claim 1, in which said auxiliary generation module comprises a thermally activated heat pump, in particular of the chemical type with a drying liquid.

21. Modular power generating system according to claim 20, in which said auxiliary generation module also comprises heat storage means.

22. Modular power generating system according to claim 1, in which said management and control means are preset to drive said converters in such a way that said main cogeneration module is able to supply reactive power both of the capacitive type and of the inductive type, said reactive power being coupled to the network by means of the abovementioned switching device.

* * * * *